Feb. 28, 1928.
M. PODNAR
1,660,524
VENTILATOR FOR AUTOMOBILES
Filed Feb. 27, 1926
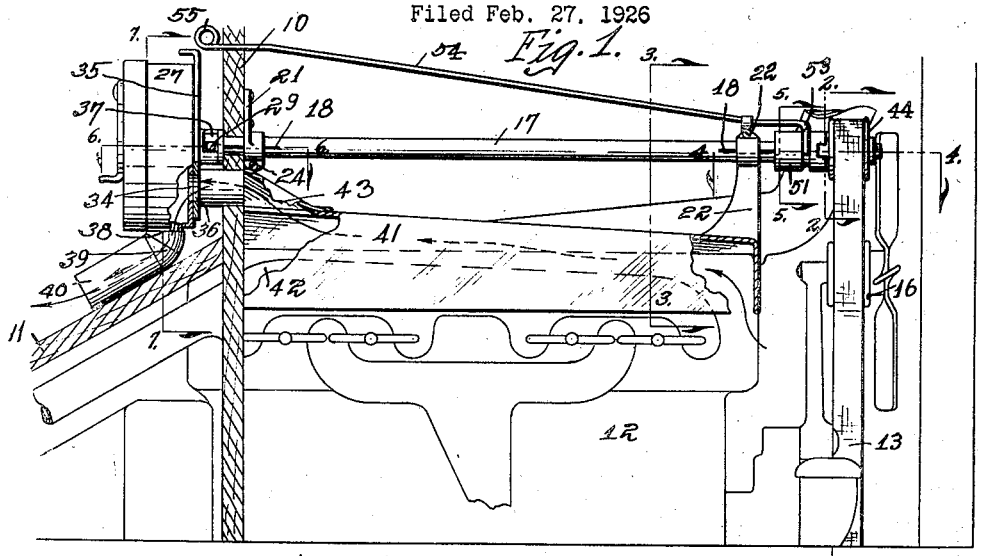
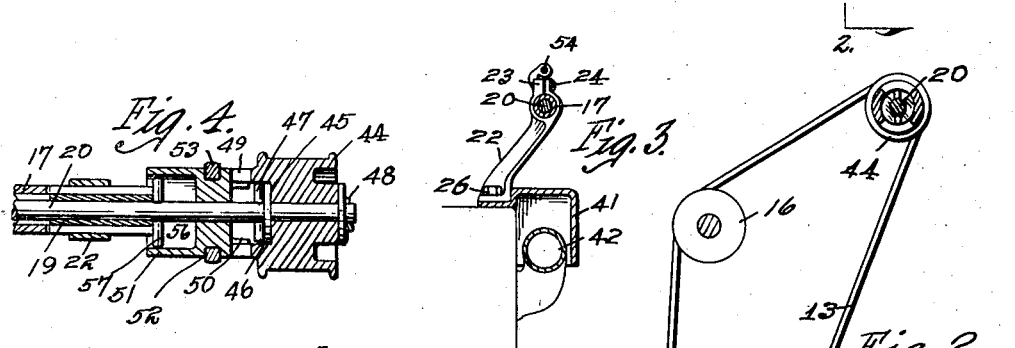
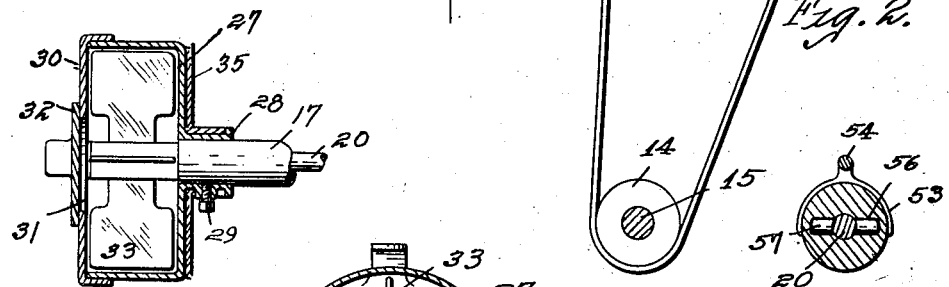
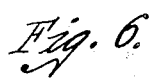
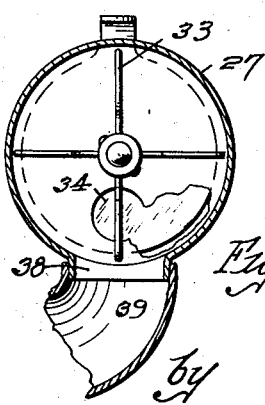
Inventor
Mile Podnar.
by Orwig & Hague, Attys.

Patented Feb. 28, 1928.

1,660,524

UNITED STATES PATENT OFFICE.

MILE PODNAR, OF DES MOINES, IOWA.

VENTILATOR FOR AUTOMOBILES.

Application filed February 27, 1926. Serial No. 91,173.

The object of my invention is to provide a device of simple, durable and inexpensive construction, which may be easily and quickly attached to the dash board of an automobile, and when so attached may be utilized either as a heater during the cold weather, or as a ventilator during the hot weather, the power for operating the same being derived from the fan belt of the engine.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved device showing the manner in which it is attached to the dash board of an automobile, and the manner in which the power is derived from the fan belt, a portion of the heater being broken away.

Figure 2 is a detail sectional view taken on the line 2—2 of Figure 1.

Figure 3 is a detail sectional view taken on the line 3—3 of Figure 1.

Figure 4 is a detail sectional view taken on the line 4—4 of Figure 1.

Figure 5 is a detail sectional view taken on the line 5—5 of Figure 1.

Figure 6 is a detail sectional view of the fan casing taken on the line 6—6 of Figure 1.

Figure 7 is a detail sectional view taken on the line 7—7 of Figure 1.

The numeral 10 indicates the dash board of an automobile, 11 the floor board and 12 the engine block, which is provided with the usual fan belt 13, said belt being driven by means of a pulley 14 from the crank shaft 15. The fan pulley is designated by the numeral 16.

My improved device comprises a tube 17 having each end provided with a slot 18. Each end of said tube 17 is provided with a bearing member 19 which is in the form of a tube inserted into the end of the member 17. The said bearing is of such size that it snugly fits the interior surface of said tube. A drive shaft 20 is rotatively mounted in said bearings and extends longitudinally through the tube 17. One end of said tube 17 is provided with a bracket 21, while the other end is provided with a bracket 22. Each of said brackets is provided with a slotted bearing member for receiving the said tube 17, said bearings being provided with outwardly projecting flanges 23 which are arranged in such a manner as to form clamps, by means of which said bearing, said tube and the bearings 19 are clamped together by bolts 24, thereby providing simple means for clamping and securing said parts together.

The bracket 22 is designed to be supported on the forward end of the top portion of the engine block by means of cap bolts 26, while the bracket 21 is secured to the dash 10 with the rear end of the tube 17 extending through a suitable opening therein and into the interior of the car body. The inner end of the said tube 17 is designed to support a fan casing 27 which is provided with a hub 28, said hub being secured to the tube 17 by means of a set screw 29. The inner end of the fan casing 27 is provided with an end plate 30 having a central intake draft opening 31, said opening being covered by a swinging valve member 32. The inner end of the shaft 20 extends into the fan casing and is provided with a fan 33. The outer end of the fan casing 27 is also provided with an opening 34 which may be opened or closed by means of a valve 35 in the form of a disk rotatively mounted on the hub 28. Said disk is provided with an opening 36 in alinement with the opening 34 when said disk is in one position of its movement. The hub of the disk is provided with a slot 37 for receiving the set screw 29 and permitting a limited rotary movement on the hub of said disk.

The lower side of the fan casing 27 is provided with a discharge pipe 38 having an adjustable elbow 39 which terminates in a discharge pipe 40. The elbow 39 is rotatively mounted on the member 38 in such a manner that the pipe 40 may be swung to various angles relative to the dash 10, and thereby provide means whereby the air discharged from said fan may be directed to any desired point near the floor board 11. A casing 41 is supported around the exhaust manifold 42, said casing being provided with a discharge pipe 43 extending through the dash 10, and in alinement with the openings 34 and 36, so that as the fan is actuated, air will be drawn through the casing 41 to said fan and discharged through the pipe 40, the air becoming heated as it passes around the exhaust manifold.

If it is desired to use the fan as a ventilator, the valve 35 is moved to a closed position, cutting off the hot air from the member 41, while the valve 32 is moved to an open position permitting air from the interior of the car body to enter through the opening 31 and to be discharged through the pipe 40, thereby providing a circulation of air within the body of the car at a point near the floor board thereby providing means for cooling said floor board.

Rotation is imparted to the shaft 20 by means of a pulley 44 which is mounted on the outer end of said shaft, and operated by the belt 13. The inner side of the pulley 44 is provided with a recess 45 in which is mounted a washer 46. The sidewise movement of the pulley is limited by means of pins 47 and 48, the pin 47 being designed to rest in the recess 45. The inner side of said pulley is also provided with clutch dogs 49 which are designed to coact with the clutch dogs 50 of a sliding sleeve 51. Said sleeve 51 is provided with an annular groove 52 and an operating yoke 53, which terminates in a rearwardly extending rod 54 which passes through the dash 10 and has a loop 55 on its inner end. Said rod 54 is slidably mounted and provides means whereby the sliding sleeeve 51 may be moved inwardly and outwardly and the dogs 50 moved into and out of engagement with the dogs 49, and means whereby the shaft 20 will be thrown into and out of operation with the pulley 44. The sleeve 51 is provided with radial grooves 56 which are designed to receive a pin 57 extending through the shaft 20, said pin serving to impart rotary movement to said sleeve and also to limit the inward longitudinal movement of the shaft 20, the outward movement of said shaft 20 being limited by the hub of the fan 33.

By this arrangement it will be seen that the pulley 44 is rotated continuously from the belt 13, and that the fan may be thrown into and out of operation with the said pulley by simply imparting a sliding movement to the rod 54 by means of the loop 55. It will further be seen that while the fan is being rotated, the device may be used for drawing hot air into the body of the car, or for re-circulating the air within the car for cooling purposes, simply by the proper manipulation of the valves 32 and 35 as before described.

Thus it will be seen that I have provided a combined ventilator and heating device for automobiles which may be easily and quickly applied without any special mechanical skill inasmuch as the bearings are mounted in the tube 17 and secured in proper alinement with each other. The bracket 22 is so constructed that it may be mounted on the engine cap bolts which are already installed.

I claim as my invention:

1. In a device of the class described, a tubular support provided with a slot at each end, a tubular bearing member within each slotted end of said support, a bracket member for supporting each end of said tubular support, means for clamping said bracket members, said tubular support and said tubular bearing members together, a shaft in said bearing members, a fan on one end of said shaft, a belt wheel on the opposite end of said shaft, means for throwing said belt wheel into and out of operative relation with said shaft.

2. In a device of the class described, a tubular support provided with a slot at each end, a tubular bearing member within each slotted end of said support, a bracket member for supporting each end of said tubular support, means for clamping said bracket members, said tubular support and said tubular bearing members together, a shaft in said bearing members, a fan on one end of said shaft, a belt wheel on the opposite end of said shaft, means for throwing said belt wheel into and out of operative relation with said shaft, and a fan casing for said fan, said casing being detachably mounted on said tubular support.

3. In a device of the class described, a tubular support provided with a slot at each end, a tubular bearing member within each slotted end of said support, a bracket member for supporting each end of said tubular support, means for clamping said bracket members, said tubular support and said tubular bearing members together, a shaft in said bearing members, a fan on one end of said shaft, a belt wheel on the opposite end of said shaft, means for throwing said belt wheel into and out of operative relation with said shaft, a fan casing for said fan, said casing being detachably mounted on said tubular support, said casing being provided with a discharge pipe, and an elbow rotatively mounted on said discharge pipe.

4. In a device of the class described, a tubular support provided with a slot at each end, a tubular bearing member within each slotted end of said support, a bracket member for supporting each end of said tubular support, means for clamping said bracket members, said tubular support and said tubular bearing members together, a shaft in said bearing members, a fan on one end of said shaft, a belt wheel on the opposite end of said shaft, means for throwing said belt wheel into and out of operative relation with said shaft, a fan casing for said fan, said casing being detachably mounted on said tubular support, said casing being provided with a discharge pipe and two inlet openings, an elbow rotatively mounted on said discharge pipe, and a valve or each of said openings.

Des Moines, Iowa, February 18, 1926.

MILE PODNAR.